United States Patent [19]

Dunlop et al.

[11] 4,112,199

[45] Sep. 5, 1978

[54] LANTHANUM NICKEL HYDRIDE-HYDROGEN/METAL OXIDE CELL

[75] Inventors: James D. Dunlop, Gaithersburg; Joseph Stockel, Rockville, both of Md.

[73] Assignee: Communications Satellite Corporation, Washington, D.C.

[21] Appl. No.: 782,158

[22] Filed: Mar. 28, 1977

Related U.S. Application Data

[63] Continuation of Ser. No. 645,504, Dec. 30, 1975, abandoned.

[51] Int. Cl.$^2$ .......................................... H01M 4/00
[52] U.S. Cl. ........................................ 429/29; 429/35; 429/40
[58] Field of Search .................. 429/27, 29, 34, 35, 429/40, 46, 218

[56] References Cited

U.S. PATENT DOCUMENTS

| | | | |
|---|---|---|---|
| 3,382,106 | 5/1968 | Jung et al. | 252/182.1 |
| 3,405,008 | 10/1968 | Dilworth et al. | 429/42 |
| 3,409,474 | 11/1968 | Jung et al. | 429/42 |
| 3,455,845 | 7/1969 | Weicke et al. | 429/40 X |
| 3,669,745 | 6/1972 | Beccu | 429/218 X |
| 3,824,131 | 7/1974 | Beccu | 429/218 X |

*Primary Examiner*—Charles F. LeFevour
*Attorney, Agent, or Firm*—Sughrue, Rothwell, Mion, Zinn and Macpeak

[57] ABSTRACT

A sealed electric fuel cell of the type utilizing a reoxidizable compound as the positive electrode and a hexagonal nickel-rare earth metal hydride as the negative electrode is disclosed. The energy released by the electrochemical oxidation-reduction reaction of the anode appears in the cell as electrical energy.

8 Claims, 7 Drawing Figures

U.S. Patent Sept. 5, 1978 4,112,199
FIG.1
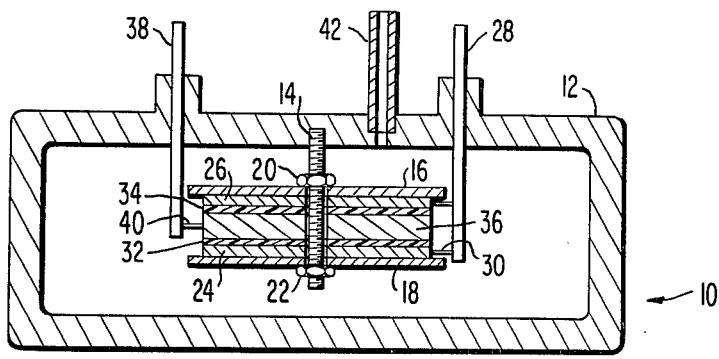
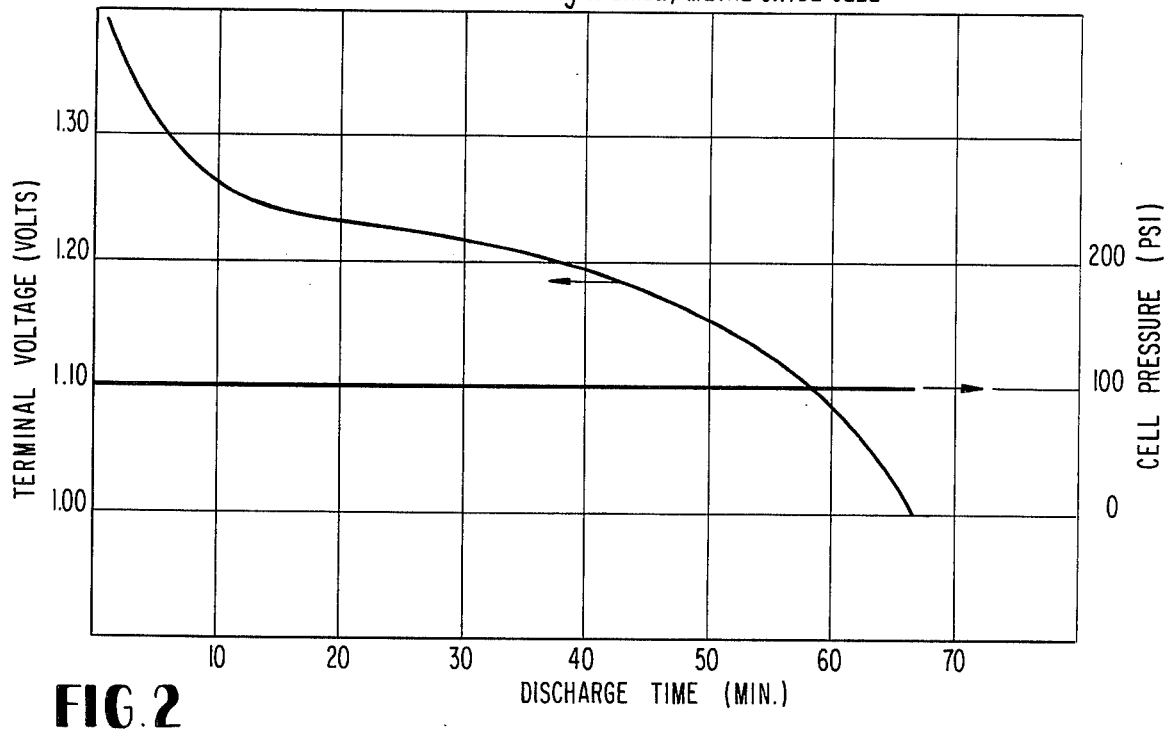
FIG.2
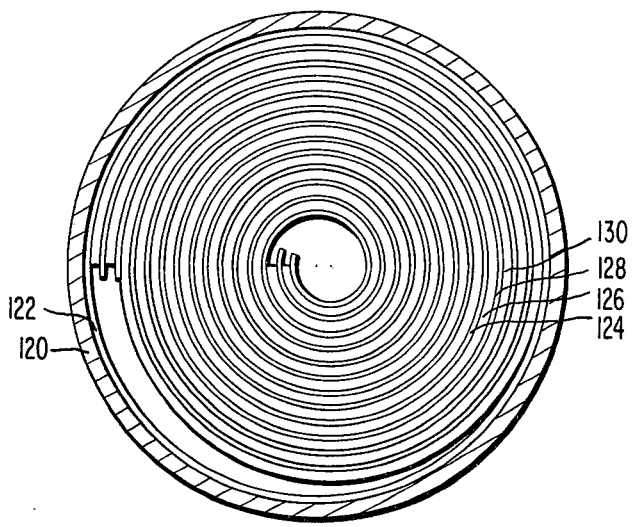
FIG.7

LANTHANUM NICKEL HYDRIDE-HYDROGEN/METAL OXIDE CELL

This is a continuation of application Ser. No. 645,504, filed Dec. 30, 1975, now abandoned.

BACKGROUND OF THE INVENTION

1. Field of the Invention

This invention relates to rechargeable fuel cells and more particularly to an improved cell in which the positive electrode contains the oxidizing agent and the negative electrode is formed from a hexagonal intermetallic compound of the composition $AB_5$ where A represents a rare-earth metal and B represents nickel or cobalt.

2. Prior Art

Considerable interest and attention has been directed to the development of fuel cells and much research has centered around problems of safety due, primarily to the use of high pressure hydrogen in lightweight pressure vessels. Optimizing the cells while maintaining or increasing efficiency has been the subject of continuing study with the development of a type of cell using a gas as one member of the electrochemical couple and a chemically active solid state material as the other member. A survey of contemporary research efforts in this area is found in a 1973 publication by NASA entitled, "Fuel Cells", SP-5 NASA SP-5115.

As disclosed in U.S. patent application Ser. No. 259,524, filed on June 5, 1972 now U.S. Pat. No. 3,867,199 and entitled "Nickel Hydrogen Fuel Cell" (and assigned to the assignee of this invention), one type device is a fuel cell wherein at the negative electrode is a chemically oxidizable and ionizable gas such as hydrogen and at the positive electrode is an electrochemically reducible metal compound typified by nickel hydroxide. In accordance with the above referenced invention, the positive electrode is nickel hydroxide on a conductive support and the negative electrode comprises a catalytic layer of platinum or palladium on a conductive support. Between these electrodes is a separator wetted with an electrolyte such as an aqueous solution of KOH.

Cells of this type can operate over a wide range of ambient temperatures and can be constructed in various configurations with inherent overcharge and overdischarge protection. The cell, however, must be hermetically sealed after filling with hydrogen and typically operates at pressures ranging from 100 to 600 psia at room temperature. Accordingly, special design considerations are present in this type of cell to effectuate operation in this high pressure realm. Furthermore, since hydrogen is stored as a gas, extreme care must be exercised to avoid explosions caused by hydrogen leakage. Some of the operating problems and conditions for these cells are discussed in Earl and Dunlop, "Chemical Storage of Hydrogen in $Ni/H_2$ Cells", COMSAT TECHNICAL REVIEW, Fall, 1973.

Accordingly, studies have tended in the direction of attempting to define systems which will store hydrogen as a reduced compound rather than as a gas at higher pressures. Some hexagonal intermetallic compounds of the generalized composition $AB_5$, where A represents a rare-earth metal and B represents nickel or cobalt, are known to easily absorb and desorb large quantities of hydrogen gas under relatively small pressures at room temperature. The ability of these compounds to absorb hydrogen is described in van Vucht et al. "Reversible Room-Temperature Absorption of Large Quantities of Hydrogen by Intermetallic Compounds", Philips Research Reports, Vol 25, pp. 133–140 (1970). This property of hexagonal nickel-rare earth metal compounds was utilized in U.S. patent application Ser. No. 506,086 now U.S. Pat. No. 3,959,018, "Low Pressure Nickel Hydrogen Cell", (assigned to the same assignee of the present application) which describes and claims the use of $LaNi_5$ for the chemical storage of hydrogen in $Ni/H_2$ cells. As shown in that patent application, the hydrogen absorbing compound is stored in a hermetically sealed pressure resistant chamber comprising the cell and is separated from the electrode stack. Cells constructed in the manner taught by that application operate in a pressure range of 15 to 30 psia at room temperature with a maximum pressure in the order of 45 psia. It is evident that such reduced pressures make the design of the cell itself easier as well as eliminating the major safety hazard, that of high pressure gaseous hydrogen since it is now stored as a reduced compound instead of as a gas.

Despite the improvements represented by the above referenced patent application, such a cell when chemically storing hydrogen requires an intermediate absorption or desorption step prior to discharge or charging. In the case of lanthanum nickel hydride, the reactions are represented by the equation:

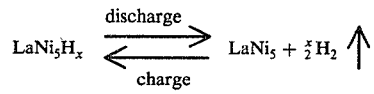

The hydrogen gas upon reaching the surfaces of the catalyst of the negative cell plates dissociates by the action of the catalyst to monatomic form and from this point the reactions shown below are conventional to fuel cells.

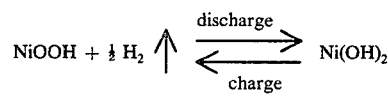

The present invention eliminates this principle disadvantage of the prior art by using $LaNi_5$ as the negative electrode in the fuel cell. The prior art, such as represented by two patents to Dilworth, U.S. Pat. Nos. 3,405,008 and 3,405,009 discloses the use of intermetallic compounds as fuel cell electrodes but neither patent teaches the use of an intermetallic hydride. The U.S. Pat. No. 3,405,008 discloses the use of a generalized compound $MNi_5$ (wherein M is a rare earth) and the U.S. Pat. No. 3,405,009 teaches a compound $M'Ni_3$ wherein M' is a transition metal. Similarly, U.S. Pat. No. 3,669,745 to Beccu discloses an accumulator electrode comprising nickel and a mixture of titanium hydride or zirconium hydride and the hydrides of the rare earths (Col. 2, lines 52–56). There is no suggestion in this patent that the electrode comprises an intermetallic compound, although in Col. 3, lines 53 et seq. it is indicated that there is some alloying between the metal hydride and the activating material.

Accordingly, it is an object of this invention to use an intermetallic hydride as an electrode in a fuel cell.

It is another object of this invention to contain the hydrogen fuel in a compact solid hydride form thereby eliminating the need for high pressure vessels to contain the fuel cell.

It is still another object of this invention to replace the platinum electrode currently being used for the negative electrode with one of a series of intermetallic hydride electrodes.

A further object of this invention is to eliminate the intermediate step of absorption or desorption required where an intermetallic hydride is stored separately from the fuel cell electrodes.

Yet another object of this invention is to reduce the volume of a fuel cell as compared with either nickel-hydrogen or nickel-cadmium cells.

SUMMARY OF THE INVENTION

These and other objects of this invention are realized in a preferred embodiment where a positive electrode such as nickel hydroxide, silver oxide or manganese dioxide is utilized. The negative electrode is an intermetallic composition such as $LaNi_5$ in place of the conventionally used platinum. This substitution represents a significant cost reduction over currently used fuel cells, and this reduction in cost is further enhanced because conventional case design and construction methods are employed. This is possible as a result of the low pressure mode of operation due to the elimination of gaseous hydrogen storage at high pressures.

Rather than utilize a separate storage means for hydrogen, thereby dictating an intermediate step of absorption or desorption, the $LaNi_5$ composition electrode oxidizes the hydrogen stored in it directly on discharge and stores hydrogen as a hydride during charging.

BRIEF DESCRIPTION OF THE DRAWINGS

FIG. 1 is a side view of a simple intermetallic hydride electrode cell.

FIG. 2 is a graph of the discharge voltage and pressure of the cell of FIG. 1.

FIG. 7 is a top view of a spiral-wound cylindrical cell made in accordance with this invention.

DETAILED DESCRIPTION OF THE PREFERRED EMBODIMENT

Figure 4:
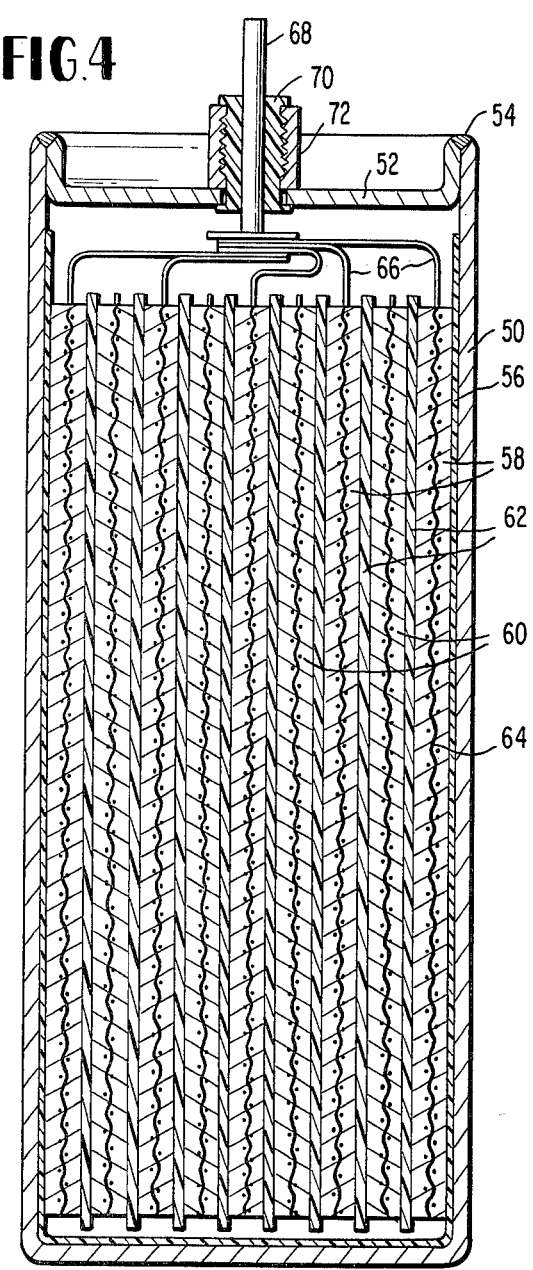
FIG. 4 is a cross-section of the prismatic cell taken along section AA of FIG. 3.

Referring now to FIG. 1, a schematic of the simplified embodiment of the invention is shown. The cell 10 is shown wherein the container 12 is fabricated from stainless steel by conventional techniques. It is important to note initially that the lower operating pressures of a cell made in accordance with this invention allows substantial reductions in both the size and the strength requirements of the container. High pressure cells require cylindrical vessels made of high strength materials, i.e., Inconel alloys or beryllium nickel with the attendant considerations of cost and size. For cells operating at the lower pressures in accordance with this invention, a variety of other materials easier to fabricate and lower in cost can be used such as 304L stainless steel. Additionally, prismatic design techniques may be employed to take into consideration space requirements and unusual mounting locations, such as in spacecraft utilization of such cells. It is believed that the size of a particular cell can be reduced by a factor of 2.5 over high pressure designs for a given desired output. The electrode stack inside the container is held in place by an insulated rod 14 which utilizes two plastic compression plates 16, 18 that sandwich the electrodes. The plates are firmly held in position by nuts 20, 22. Disposed in contact with plates 16 and 18 are the $LaNi_5$ negative electrodes 24, 26.

Before activation, lanthanum pentanickel commercially obtained is in a chunky granular form. Activation is by high pressure absorption of hydrogen with vacuum desorption cycles at room temperature. The technique is described by Reilly and Wiswall. "The Reaction of Hydrogen with Alloys of Magnesium and Copper", Inorganic Chemistry, Vol. 6, pg. 2220 (1967). High pressure adsorption is generally done at a hydrogen pressure of 40 Atm. for 2–3 hours followed by a vacuum desorption. This cycle is repeated several times. Once activated, the $LaNi_5$ becomes a fine powder suitable for formation into an anode or negative electrode.

Two methods are described for fabricating the $LaNi_5$ negative electrodes. In one method the activated $LaNi_5$ powder is mixed with a binder, such as Teflon 30 and water until it becomes dough-like in substance. The resulting mixture, normally about 30% TFE solids by weight is rolled over the entire surface of a nickel screen. The electrode is dried in a vacuum oven for approximately 5 hours. The dry electrode is then sintered in an inert atmosphere at about 275° C for approximately 30 minutes. As an alternative, a small amount of platinum black (less than 10%) may be added to the dough-like mix prior to spreading. The advantage of using platinum is to increase the rate at which hydrogen can be formed directly on the electrode. This monatomic hydrogen then moves by surface diffusion directly to the $LaNi_5$.

The second method involves spraying an aqueous hydride-Teflon dispersion onto a current collecting screen. The mix is prepared by weighting the hydride sufficiently for desired loading plus as additional amount for waste. Water is added at the ratio of approximately 18 ml/3 g. hydride and the teflon dispersion mixed in sufficient quantity to yield 30% TFE solids by weight. As in the prior example, a small amount of platinum black (less than 10%) may be added to the mix. A thin TFE sheet is applied as a backing to the screen and the mixture is sprayed in thin layers over the entire surface of the screen. When a sufficient thickness is built up, the dry electrode is sintered in an inert gas atmosphere oven for about 30 minutes at a temperature of approximately 275° C.

The plates which comprise the positive electrode 36 are made by manufacturing methods known in the prior art as described in a survey publication, "Alkaline Storage Batteries", Copyright 1969 by John Wiley & Son, Inc.

Disposed adjacent to the positive electrodes are separators 32, 34 which are fabricated from nylon, potassium titanate or any other insulating composition which remains relatively inert in the environment of the cell. Centered in the electrode stack is the positive electrode 36 made from any conventional oxidizing agent as previously described to form the electrochemical couple. Typical examples are nickel hydroxide, silver oxide, manganese dioxide and mercuric oxide. The electrode 36 is electrically coupled to positive terminal 38b.

Negative terminal 28 is electrically connected to the negative electrodes 24, 26 by the tab 30 and similarly positive terminal 38 is electrically connected to the positive electrode 36 by tab 40.

In assembly of the cell, a quantity of electrolyte, typically about 30% by weight solution of potassium hydroxide is placed in the casing 12 via fill tube 42 after the cell stack is in place. The quantity of electrolyte placed in the cell is limited to the amount needed to completely wet the electrode stack while at the same time allowing for adequate oxygen recombination on overcharge.

Although aqueous KOH is the preferred electrolyte, KOH may be replaced by or mixed with other alkaline salts, e.g., sodium or lithium hydroxides or mixtures thereof. Once the electrolyte has been added, hydrogen may be introduced into the chamber to charge it, generally about 1 atmosphere. The fill tube 42 may then be pinched to seal the cell.

In operation, it may be assumed that the cell has been fully charged and is connected for use through an exterior circuit. FIG. 2 shows the performance data for the test cell, where cell pressure and voltage are plotted as functions of time for a complete discharge. During discharge, the pressure within the cell tends to remain constant, as shown in FIG. 2 and the reaction taking place is represented as:

at the anode:

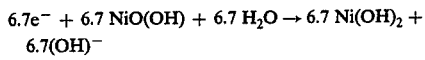

at the cathode:

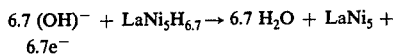

the net reaction is:

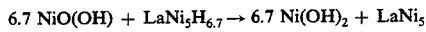

On discharge the average voltage is about 1.2 volts as seen in FIG. 2. On charging, the net reaction is reversed and the action at the cathode is characterized by the reformation of the hexagonal intermetallic hydride. A major advantage as taught by this invention is the substantial reduction of the heat dissipated during cell discharge. The conventional Ni—$H_2$ cell generates about 9 Kcal of heat per mole of hydrogen gas consumed on discharge at a slow quasi-reversible rate. This heat generation is due to the irreversibility of the cell. During a normal discharge, additional heat would be generated due to cell polarization.

The thermal advantage of using the lanthanum nickel hydride negative electrode is that during cell discharge, it absorbs heat at the rate of 7.2 Kcal/mole of hydrogen. Thus the heat generated by the cell on discharge is reduced by 7.2 Kcal/mole of hydrogen.

While $LaNi_5$ has been used as the active material, it is apparent other hexagonal intermetallic compounds of the composition $AB_5$ where A represents a rare-earth metal and B represents nickel or colbalt may be used. If other hydrides are used, with a larger heat reaction, the heat production during discharge could be reduced nearly to zero. In situations where the cycling regime consists of long charge and short discharge periods, typified by use in synchronous satellite eclipse operation, the heat generation rate during charge would still be small. For applications using such cycling regimes, the use of metal-hydride batteries would therefore be highly beneficial in terms of reducing thermal constraints on the design and location of the battery.

Figure 3:
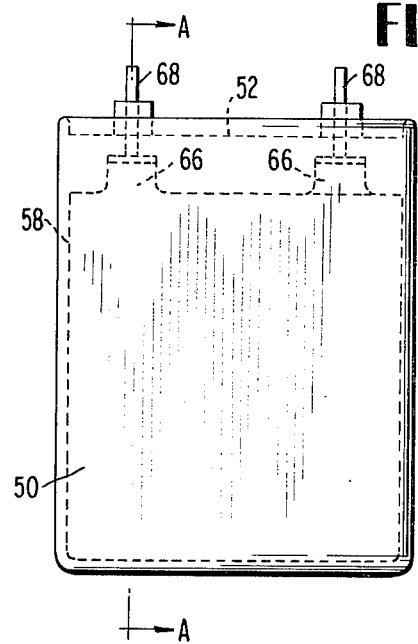
FIG. 3 is a side view of a prismatic cell made in accordance with this invention.

Several practical embodiments of the test cell in FIG. 1 are shown in FIGS. 3-7. FIGS. 3 and 4 show the construction of a prismatic cell. In FIG. 3, a side view, the container 50 has a top cap 52 welded in place at the point of junction with the container. The weld 54 takes place once the cell is completely loaded with active elements. Disposed around the inside walls of the container is an insulating layer 56 to shield the electrode stack from the container material, normally stainless steel. This insulating material can be potassium titanate, nylon, asbestos or a variety of other well-known insulators. A series of hydride electrodes 58 alternating with conventional positive electrodes 60 are disposed in a tightly packed arrangement between separators 62 inside the cell. The hydride or negative electrode may be built-up on nickel grids 64 in a manner previously described. The positive electrode can be any conventional electrode containing the oxidizing agent to form the couple, such as nickel hydroxide, silver oxide, manganese dioxide and mercuries oxide. The separators 62 may be joined to one side of each electrode during fabrication thereof, or inserted as the stack is built-up. Each electrode has a projection or tab 66 which electrically connects the electrode to the respective conductor 68. Although, as shown, each tab 66 is bent to overlap and join the conductor 68, it is apparent that a bus bar arrangement (not shown) can be used to shorten the lengths of each tab and thereby reduce problems of cracking or breaking of these tabs. The conductor 68 is embedded in a plastic compression seal 70 having a metal outer body 72 that is either welded or brazed to the top cap 52. A fill tube, not shown, may be employed for charging the cell with hydrogen or filling the casing with electrolyte.

Figure 5:
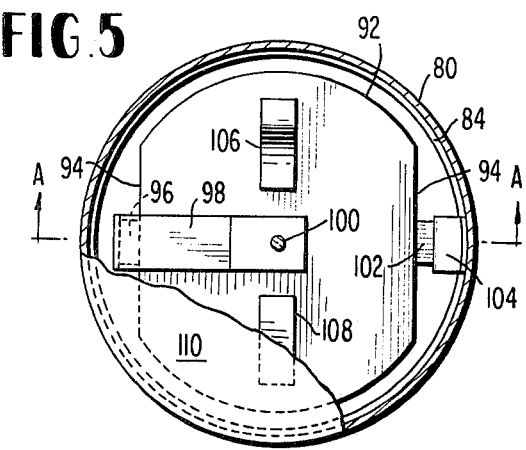
FIG. 5 is a top view of a stacked cylindrical cell made in accordance with this invention.
Figure 6:
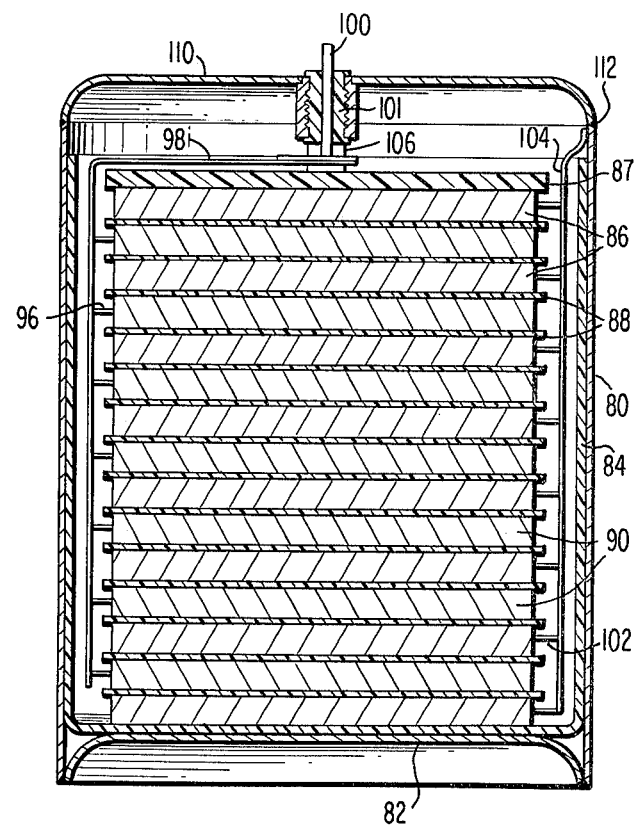
FIG. 6 is a cross-section of the stacked cylindrical cell taken along section AA of FIG. 5.

A second form of the invention, a stacked cylindrical cell, is shown in FIGS. 5 and 6. In this embodiment, a cylinder 80 has a cap 82 welded to it to form a bottom cap. An insulating liner 84 surrounds the cylinder and bottom cap walls. This liner may be a cup insert or directly bonded to the walls and is of a material previously described in the FIGS. 2 and 4 embodiment. An electrode stack comprising hydride electrodes 86, separators 88 and positive electrodes 90 is built-up of wafers having a shape 92 as shown in FIG. 5. The electrodes are generally circular with clipped portions 94 to accommodate electrode tabs. For the positive electrodes, the tabs 96 are joined to a bus bar 98 by welding or other electrical coupling. The bus bar 98 is then connected to the conductor 100, the conductor being constructed in a manner similar to the FIG. 4 embodiment having a plastic compression seal 101. The hydride electrodes 86 have tabs 102, similar to tabs 96 and are connected to bus bar 104. This bus bar is welded at a convenient place to the wall of the cylinder.

A pair of retaining springs 106, 108 are used to provide a measure of compression to the electrode stack and hold it firmly in place inside the cell. Retainer spring 106 is placed on end cap 87, projecting upward and the compressive forces are generated by the placement of top cap 110 on the cell and seam welding it in place as shown at location 112. Electrolyte may be added or utilized in a manner described for the FIG. 1 test cell embodiment and a fill tube (not shown) employed as needed.

A third embodiment is shown in FIG. 7 in which the electrodes are spiral wrapped as helices in a so-called "jelly-roll" structure. In this embodiment, shown in a cut-away top view, the cell 120 is cylindrical having a liner 122 similar to that shown in FIG. 6. A composite, comprising layers of separators 124, 126, a positive electrode 128 and a hydride electrode 130 is tightly wound in a spiral fashion to fit inside the cell. The construction of the electrodes is accomplished in a manner identical to that described herein and they are sized such that the tightly wound bundle will fit into the cell. Conductor pick-offs are at the ends of the bundle, normally, one conductor at the center of the cell and a second along the circumference.

It is to be understood that the above-identified and described embodiments are merely illustrative of numerous and varied other arrangements which may form applications of the principles of the invention. Other embodiments may readily be devised by those skilled in the art without departing from the spirit and scope of the invention.

We claim:

1. In a rechargeable metal oxide power cell of the type comprising a sealed container, said container including therein positive electrode means having a reoxidizable oxidizing agent therein, an electrolyte, and negative electrode means having catalyst capable of dissociating molecular hydrogen to monatomic hydrogen and a binder disposed thereon wherein the improvement comprises:

said catalyst of said negative electrode means comprising an unalloyed composition of $LaNi_5$ capable of absorbing or desorbing hydrogen within the negative electrode structure in response to changes in pressure in said cell, and said positive electrode means and said negative electrode means are plates stacked in said sealed container and separated from each other by insulating means.

2. The cell of claim 1 wherein said oxidizing agent in said positive electrode means comprises a compound selected from the group comprising $NiOOH$, $HgO_2$, $MnO_2$, and $AgO_2$.

3. The cell of claim 1 wherein said electrolyte is aqueous KOH.

4. The apparatus of claim 1 wherein said cell has positive and negative terminals, said terminals being in respective contact with the associated plate electrodes by a plurality of interconnecting tabs.

5. The apparatus of claim 1 wherein said electrodes are held in compression by a screw post through said electrodes, a pair of end plates mounted on said screw post means for compressing said end plates in the direction of the screw post.

6. The cell of claim 1 wherein said electrode plates are held in compression by walls of said cell.

7. The cell of claim 1 wherein said electrode plates are held in compression by spring means between said plate stack and a wall of said cell.

8. The cell of claim 1 wherein said insulating means is selected from the group comprising nylon, asbestos or potassium titanate.

* * * * *

UNITED STATES PATENT AND TRADEMARK OFFICE
CERTIFICATE OF CORRECTION

PATENT NO. : 4,112,199
DATED : September 5, 1978
INVENTOR(S) : James D. DUNLOP et al It is certified that error appears in the above-identified patent and that said Letters Patent are hereby corrected as shown below:

IN THE SPECIFICATION:

Column 4, line 39 - delete "as" insert -- an --

Column 6, line 22 - delete "mercuries" insert -- mercuric --

IN THE CLAIMS:

Column 8, line 20 - after "post" insert -- and --

Signed and Sealed this

Fifteenth Day of May 1979

[SEAL]

Attest:

RUTH C. MASON
*Attesting Officer*

DONALD W. BANNER
*Commissioner of Patents and Trademarks*